(12) United States Patent
Cowden et al.

(10) Patent No.: US 8,572,967 B1
(45) Date of Patent: Nov. 5, 2013

(54) HIGH EFFICIENCY OTEC SYSTEM

(76) Inventors: David H. Cowden, Katy, TX (US); Era W. Cowden, Katy, TX (US)

( * ) Notice: Subject to any disclaimer, the term of this patent is extended or adjusted under 35 U.S.C. 154(b) by 323 days.

(21) Appl. No.: 13/074,171

(22) Filed: Mar. 29, 2011

Related U.S. Application Data

(60) Provisional application No. 61/431,462, filed on Jan. 11, 2011, provisional application No. 61/435,588, filed on Jan. 24, 2011.

(51) Int. Cl.
*F03G 7/05* (2006.01)

(52) U.S. Cl.
USPC ........................................ 60/641.7

(58) Field of Classification Search
USPC ............. 60/398, 641.1, 641.6, 641.7; 165/67; 126/381.1, 381.2; 29/890.07
See application file for complete search history.

(56) References Cited

U.S. PATENT DOCUMENTS

| | | | | |
|---|---|---|---|---|
| 1,952,520 A | * | 3/1934 | Urquhart | 165/286 |
| 3,312,054 A | * | 4/1967 | Anderson et al. | 60/531 |
| 4,055,145 A | | 10/1977 | Mager | |
| 4,189,647 A | | 2/1980 | Wittig | |
| 4,311,012 A | * | 1/1982 | Finley | 60/641.7 |
| 4,312,288 A | * | 1/1982 | Finsterwalder et al. | 114/264 |
| 4,346,561 A | | 8/1982 | Kalina | |
| 4,372,126 A | | 2/1983 | Sebald | |
| 4,422,799 A | * | 12/1983 | Green et al. | 405/158 |
| 4,537,030 A | | 8/1985 | Berman | |
| 4,742,682 A | * | 5/1988 | Assaf et al. | 60/641.1 |
| 5,513,494 A | | 5/1996 | Flynn | |
| 7,328,578 B1 | * | 2/2008 | Saucedo | 60/641.1 |
| 8,424,306 B2 | * | 4/2013 | Prueitt | 60/641.1 |
| 2007/0289303 A1 | * | 12/2007 | Prueitt | 60/641.7 |
| 2008/0156731 A1 | | 7/2008 | Gordon | |
| 2009/0077969 A1 | * | 3/2009 | Prueitt | 60/641.7 |
| 2009/0293724 A1 | * | 12/2009 | Ivison | 95/288 |
| 2011/0061383 A1 | * | 3/2011 | McAlister | 60/641.7 |

FOREIGN PATENT DOCUMENTS

GB 2395754 A * 6/2004

* cited by examiner

*Primary Examiner* — Thomas Denion
*Assistant Examiner* — Shafiq Mian
(74) *Attorney, Agent, or Firm* — Jason L. Gilbert

(57) ABSTRACT

A high efficiency OTEC system for the efficient and low-cost production of energy and potable water through ocean thermal energy conversion. The high efficiency OTEC system utilizes a working fluid such as ammonia with a standard Rankine cycle. One embodiment of the present invention comprises a heat exchanger which includes a fluid transfer assembly, a pump, a first heater, a turbine and a generator. The fluid transfer assembly utilizes a condenser conduit to condense working fluid by transferring the fluid to the cold depths of the ocean before returning to the warm surface through an insulated return conduit. The working fluid is vaporized through use of the first heater before entering a turbine connected to a generator to produce energy. In some embodiments, a second heater may be added to the system for production of potable water. In further embodiments, a third heater may be provided for additional heating capabilities.

18 Claims, 4 Drawing Sheets

HIGH EFFICIENCY OTEC SYSTEM

CROSS REFERENCE TO RELATED APPLICATIONS

I hereby claim benefit under Title 35, United States Code, Section 119(e) of U.S. provisional patent application Ser. No. 61/431,462 filed Jan. 11, 2011. The 61/431,462 application. The 61/431,462 application is hereby incorporated by reference into this application.

I also hereby claim benefit under Title 35, United States Code, Section 119(e) of U.S. provisional patent application Ser. No. 61/435,588 filed Jan. 24, 2011. The 61/435,588 application. The 61/435,588 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to an ocean thermal energy conversion system and more specifically it relates to a high efficiency OTEC system for the efficient and low-cost production of energy and potable water through ocean thermal energy conversion.

2. Description of the Related Art

Any discussion of the related art throughout the specification should in no way be considered as an admission that such related art is widely known or forms part of common general knowledge in the field.

Systems for the production of energy using ocean thermal energy conversion (OTEC) have been in use for years. The need for such OTEC systems for energy production has increased in recent years due to an increased worldwide demand for energy in combination with the uncertainty of oil prices and the inherent dangers of harvesting nuclear energy.

Conventional closed-cycle OTEC systems pump warm surface seawater through a heat exchanger to vaporize working fluid. Cold water pumped through a second heat exchanger acts to condense the vaporized working fluid into a liquid, which is recycled through the system. The use of multiple heat exchangers in such conventional systems are both expensive to install and difficult to maintain. By providing an OTEC system which does not utilize multiple heat exchangers, significant cost savings may be realized. Further, existing systems tend to disregard the significant amount of potable water which may be easily produced as a by-product of such OTEC systems.

Because of the inherent problems with the related art, there is a need for a new and improved high efficiency OTEC system for the efficient and low-cost production of energy and potable water through ocean thermal energy conversion.

BRIEF SUMMARY OF THE INVENTION

A system for the efficient and low-cost production of energy and potable water through ocean thermal energy conversion. The invention generally relates to an OTEC system which utilizes a working fluid such as ammonia with a standard Rankine cycle. One embodiment of the present invention comprises a heat exchanger which includes a fluid transfer assembly, a pump, a first heater, a turbine and a generator. The fluid transfer assembly utilizes a condenser conduit to condense working fluid by transferring the fluid to the cold depths of the ocean before returning to the warm surface through an insulated return conduit. The working fluid is vaporized through use of the first heater before entering a turbine connected to a generator to produce energy. In some embodiments, a second heater may be added to the system for production of potable water. In further embodiments, a third heater may be provided for additional heating capabilities.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
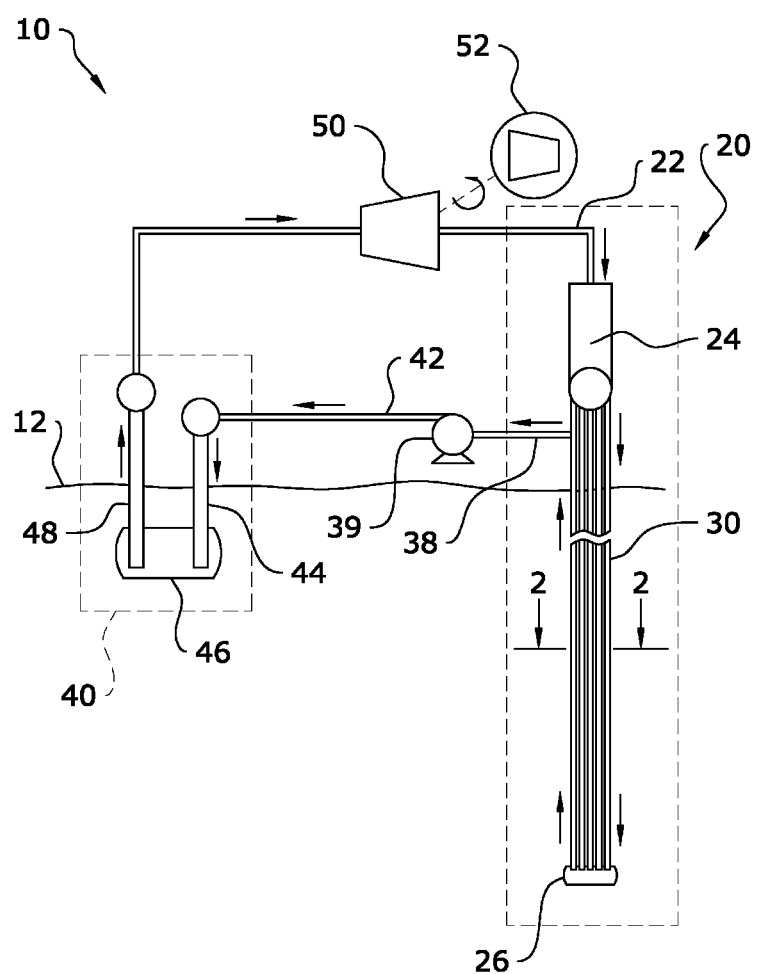
FIG. 1 is a block diagram illustrating a main embodiment of the present invention.

Turning now descriptively to the drawings, in which similar reference characters denote similar elements throughout the several views, FIGS. 1 through 4 illustrate a high efficiency OTEC system 10 which utilizes a working fluid such as ammonia with a standard Rankine cycle. One embodiment of the present invention comprises a heat exchanger 20 which includes a fluid transfer assembly 30, a pump 39, a first heater 40, a turbine 50 and a generator 52. The fluid transfer assembly 30 utilizes a condenser conduit 34 to condense working fluid by transferring the fluid to the cold depths of the ocean before returning to the warm surface through an insulated return conduit 36. The working fluid is then vaporized through use of the first heater 40 before entering a turbine 50 connected to a generator 52 to produce energy. In some embodiments, a second heater 60 may be added to the system for production of potable water.

B. Heat Exchanger

The present invention utilizes the well-known Rankine cycle in combination with a working fluid such as ammonia to produce energy through ocean thermal energy conversion.

While ammonia is a preferred working fluid for use with the present invention, it is appreciated that various other types of working fluids which have the requisite chemical properties for use in a Rankine cycle may be utilized with the present invention. Accordingly, the present invention should not be construed as being limited to use with ammonia.

The present invention will generally utilize a cold side heat exchanger 20 for cooling and condensing spent working fluid from a low pressure vapor state to a liquid state. By utilizing the unique heat exchanger 20 design described herein, the present invention does not require the use of pumped seawater for heat exchanging purposes as is used in conventional OTEC systems.

As shown in FIG. 1, the cold side heat exchanger 20 of the present invention is generally comprised of a turbine outlet conduit 22, a working fluid collector 24, a fluid transfer assembly 30, a cold fluid reservoir 26, a pump connector 38 and a pump 39. After expanding within the turbine 50 to power the generator 52, working fluid will be in a low pressure vapor state. A turbine outlet conduit 22 is generally attached to the outlet of the turbine 50 so that this spent working fluid may be reintroduced into the cycle for additional power generation. The turbine outlet conduit 22 may be comprised of various structure, materials and designs, so long as it is capable of transferring spent working fluid in its low pressure vapor state into the working fluid collector 24 of the present invention.

The working fluid collector 24 is comprised of a storage vessel which acts to store the spent working fluid prior to its entry into the fluid transfer assembly 30. The working fluid collector 24 may be comprised of various types and sizes of storage vessels so long as it is capable of safely storing the spent working fluid prior to its transfer into the fluid transfer assembly 30. While the working fluid collector 24 is generally positioned above the ocean surface 12 as shown in the figures, it is preferable that the collector 24 be comprised of a material which can withstand repeated exposure to salt water without compromising its structural integrity.

Working fluid will generally exit the working fluid collector 24 in its low pressure vapor state and enter the present invention's fluid transfer assembly 30 to be cooled and condensed into a liquid form. The fluid transfer assembly 30 of the present invention will generally be comprised of a set of conduits which act to transfer the working fluid to the cold depths of the ocean for cooling and condensing and then return the working fluid to the ocean surface for further use in the system. The depth to which the fluid transfer assembly 30 extends will vary depending on the specific ocean temperature and location of the present invention. Preferably, the fluid transfer assembly 30 will extend to a depth at which the ocean water is sufficiently cold to properly cool the working fluid to a temperature point below its latent heat of fusion and thus condense the working fluid from its low pressure vapor state to a liquid state.

Figure 2:
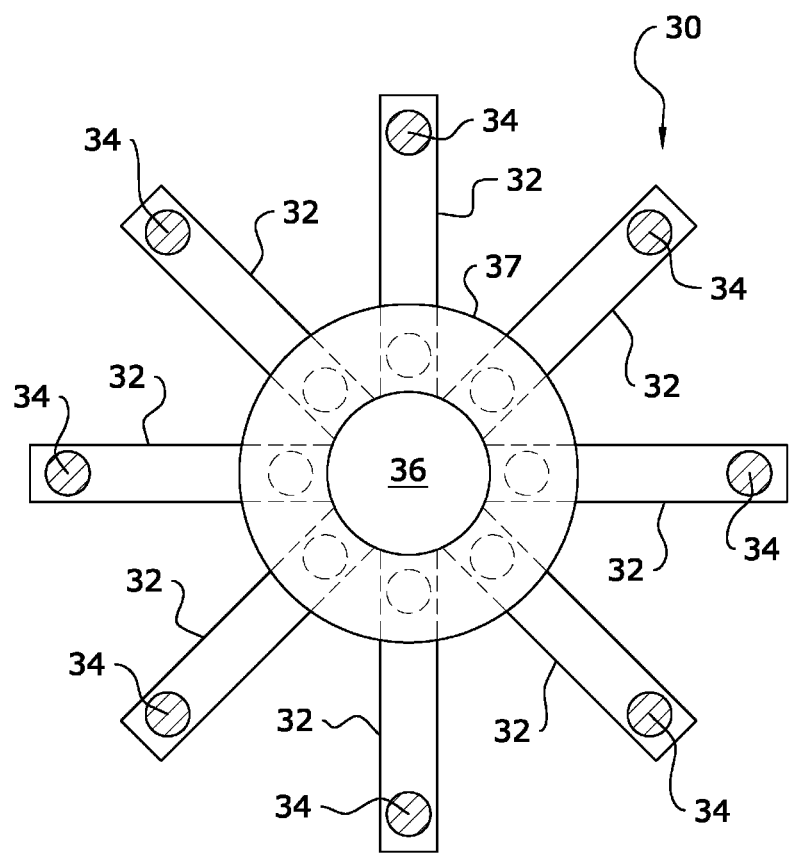
FIG. 2 is a sectional view of the fluid transfer assembly of the present invention.

FIG. 2 illustrates a cross-sectional view of the fluid transfer assembly 30 of the present invention. As seen therein, the fluid transfer assembly 30 of the present invention will generally be comprised of a hub-and-spoke design with a plurality of spokes 32 extending outward from a central point.

At the outer end of each of the spokes 32, a condenser conduit 34 is provided for transferring working fluid in its low vapor state to the depths of the ocean to be cooled and condensed into a liquid state. Each condenser conduit 34 will generally be comprised of non-insulated piping which extends into the depths of the ocean. The condenser conduit 34 may be comprised of various types of materials which will effectuate the necessary heat transfer to liquefy the working fluid from its low pressure vapor state. By way of example and without limitation, the condenser conduit 34 may be comprised of such materials as carbon and/or stainless steel.

The use of the spoke design allows each of the condenser conduits 34 to be fully surrounded by the cold ocean water to efficiently cool and condense the working fluid. While the figures illustrate the use of eight spokes 32 and accompanying condenser conduits 34, it is appreciated that more or less may be utilized for various applications of the present invention.

Working fluid will generally transfer down the condenser conduit 34 of the fluid transfer assembly 30 to a cold fluid reservoir 26 as shown in FIG. 1. The cold fluid reservoir 26 will generally be comprised of a storage vessel which acts to further cool and condense the working fluid prior to its return to the surface via the return conduit 36.

As seen in FIG. 2, the hub of the hub-and-spoke design of the fluid transfer assembly 30 will generally be comprised of a central return conduit 36 which acts to transfer the liquefied working fluid back to the ocean surface. The return conduit 36 will generally be surrounded by insulation 37 for at least a portion of its length from the cold fluid reservoir 26 to the ocean surface. In some embodiments, the insulation 37 may extend for the entire length of the return conduit 36. However, it is appreciated that the insulation 37 need only surround the length of the return conduit 36 which is in ocean water which is warm enough to heat the cooled and condensed working fluid on its return trip to the surface. In a preferred embodiment, the upper ⅔ of the length of the return conduit 36 will be insulated.

The return conduit 36 may be comprised of various structures, but will preferably be comprised of piping which extends through the central portion of the fluid transfer assembly 30 as shown in FIG. 2. Further, the return conduit 36 may be comprised of various materials, but will preferably be comprised of a material which minimizes any heat transfer between the warmer portions of the ocean and the working fluid within the return conduit 36. Various types of insulation materials may be utilized for the insulation 37 so long as the return conduit 36 is properly insulated to prevent heat transfer. It is appreciated that, in some embodiments, materials may be utilized for the return conduit 36 which do not require the use of separate surrounding insulation 37.

The cooled and condensed working fluid will be transferred up the return conduit 36 through use of a pump 39. The pump 39 may be comprised of various types of pumps known in the art, including positive displacement pumps, rotary pumps, centrifugal pumps and the like. The specifications of the pump 39, such as horsepower, flow and delivery pressures, may vary depending on the power generation parameters and working fluid characteristics of the particular application of the present invention.

The pump 39 will generally be directly connected to the return conduit 36 by a pump connector 38 as shown in FIG. 1. The pump connector 38 will generally be comprised of a conduit which directly connects the return conduit 36 to the inlet of the pump 39. Preferably, the pump 39 will be positioned above the ocean surface 12. Such a configuration requires less maintenance for the pump 39.

Upon entering the pump 39, the liquefied working fluid will generally be pressurized before being transferred to the first heater 40 of the present invention. While the amount of pressurization will vary depending on the specifics of the application of the present invention, including the type of working fluid utilized, it is preferable that the pump 39 pressurizes the working fluid to about 6 atmospheres.

C. First Heater.

The working fluid will generally exit the pump 39 via a pump outlet conduit 42 in a high pressure liquid state and enter a first heater 40 to be heated to a vapor state prior to entering the turbine 50. The first heater 40 will generally be comprised of a series of conduits and vessels which utilize the warm surface layer of the ocean to heat the working fluid into a vapor form.

As shown in FIG. 1, the first heater 40 of the present invention will generally be comprised of a first heater inlet conduit 44, a hot fluid reservoir 36 and a first heater outlet conduit 48. The working fluid will exit the pump 39 at a position above the ocean surface 12 via the pump outlet conduit 42. The pump outlet conduit 42 will generally extend horizontally above the ocean surface 12 and connect to a vertically-oriented first heater inlet conduit 44 which extends into the warm ocean surface 12. As the working fluid passes through the first heater inlet conduit 44, it will be heated by the ocean before reaching the hot fluid reservoir 36.

The hot fluid reservoir 36 will generally be comprised of a storage vessel which acts to store and further heat the working fluid before it is transferred back out of the ocean via the first heater outlet conduit 48. At this point, the working fluid should be comprised of a vapor for transfer to the turbine 50 for power generation. In some embodiments which will be discussed below, additional heaters 60, 70 may be utilized if the ocean temperature at the ocean surface 12 is insufficient to vaporize the working fluid.

D. Turbine.

After exiting the first heater 50 in a vapor state, the working fluid will be transferred to a turbine via the first heater outlet conduit 48. The turbine 50 used with the present invention may be comprised of various types of conventional turbines known in the art. The turbine 50 will receive the hot, pressurized working fluid vapor and turn an output shaft as the vapor expands. The specifications of the turbine 50, including horsepower, flow, operating pressures, vane configuration and style/number of turbine stages will vary for different applications of the present invention.

A generator 52 will generally be connected to the turbine 50 to generate electrical power. The turning of the output shaft of the turbine 50 will turn the generator's 52 input shaft to generate electricity. Various types of generators 52 may be utilized with the present invention. It is appreciated that the specifications of the generator 52 used with the present invention may vary depending on the application of the present invention.

E. Second Heater.

Figure 3:
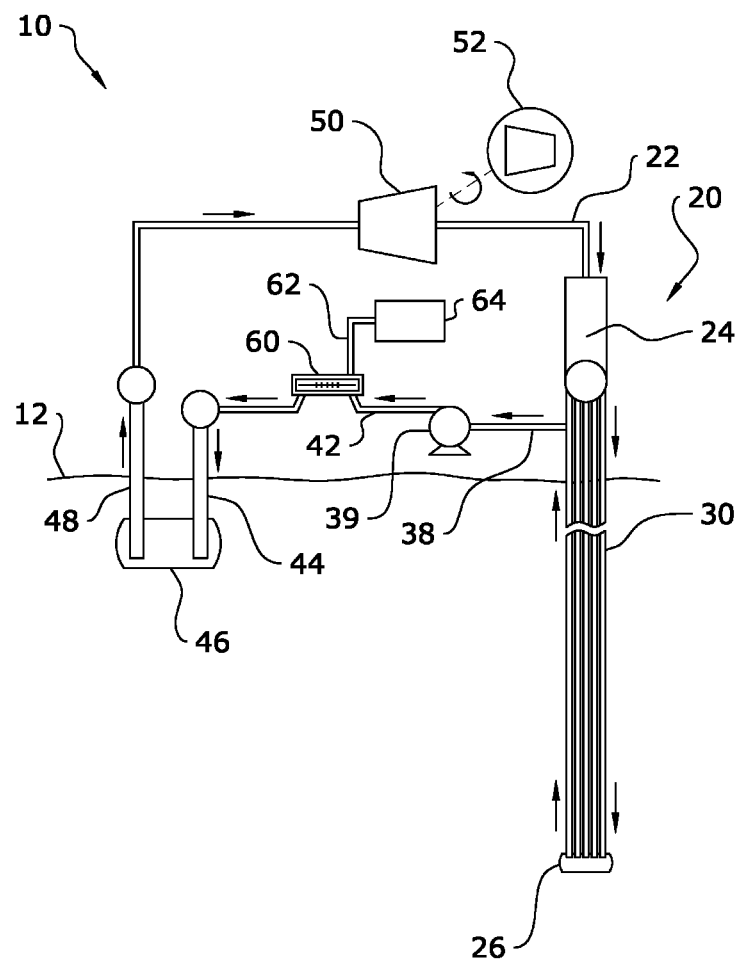
FIG. 3 is a block diagram illustrating a first alternate embodiment of the present invention which utilizes a second heater.

In some embodiments of the present invention, a second heater 60 may be utilized to both provide additional heating capabilities of the system and to generate potable water. As shown in FIG. 3, the second heater 60 will generally be positioned in-line with the pump outlet conduit 42 between the pump 39 and the first heater 40. The second heater 60 will generally be comprised of an air-type heater which acts to expand the cold, pressurized working fluid that exits the fluid pump 39. The second heater 60 will generally be comprised of an air/fluid heat exchanger which is positioned above the ocean surface 12. Air is forced by a fan across the second heater 60, which condenses moisture in the air. A collection receptacle such as a pan is positioned underneath the second heater 60 to collect the condensed moisture from the air. Potable water which is generated in such a manner is then transferred to a water storage vessel 64 via a water conduit 62 while the heated working fluid is transferred to the first heater 40 to be further heated by the warm ocean surface 12. The specifications of the second heater 60 will vary depending on the particular application of the present invention.

F. Third Heater.

Figure 4:
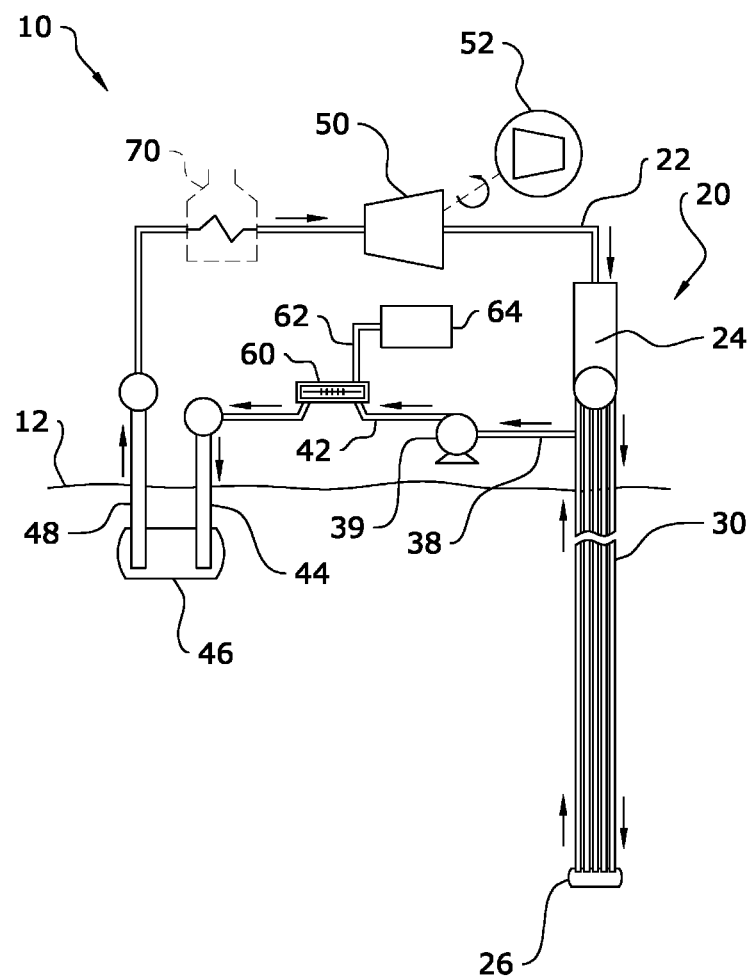
FIG. 4 is a block diagram illustrating a first alternate embodiment of the present invention which utilizes a third heater.

In some embodiments as shown in FIG. 4, a third heater 70 may also be provided for providing additional heating/vaporization of the working fluid prior to its entry into the turbine 50. The third heater 70 will generally be positioned in-line with the first heater outlet conduit 48 in between the first heater 40 and the turbine 50 at a position above the ocean surface 12. The third heater 70 may be comprised of various types of heating structures, including solar heaters, geothermal source heater or waste source heaters. The use of a third heater 70 may improve the overall cycle efficiency by increasing the difference between the hot and cold working fluid conditions. The specifications and type of the third heater 70 may vary depending on the application and location of the present invention.

G. Operation of Preferred Embodiment.

The present invention utilizes a closed loop cycle with a working fluid such as ammonia. After expanding in the turbine 50, the working fluid will be in a low pressure vapor state and will flow into the working fluid collector 24 via the turbine outlet conduit 22. The working fluid will then enter the heat exchanger 20 through the fluid transfer assembly 30. The working fluid will travel to the depths of the ocean via the condenser conduits 34 of the fluid transfer assembly 30. As the working fluid travels down the condenser conduits 34, it will be cooled and condensed into a liquid form. The working fluid will enter the cold fluid reservoir 26 for further cooling before returning to the ocean surface 12 via the return conduit 36 of the fluid transfer assembly 30. The return conduit 36 is surrounded by insulation 37 to prevent heating of the cooled liquid working fluid. The pump 39 will provide the force to draw the working fluid up the length of the return conduit 36.

The liquid working fluid will exit the fluid transfer assembly 30 and be transferred to the pump 39 via the pump connector 38. The pump 39 will act to pressurize the liquid working fluid before it is transferred to the first heater 40 via the pump outlet conduit 42. The first heater 40 will act to heat the working fluid into a vapor form through use of the first heater inlet conduit 44, the hot fluid reservoir 46 and the first heater outlet conduit 48, which pass the working fluid through the warm ocean near the ocean surface 12. The vaporized working fluid will exit the second heater 40 via the first heater outlet conduit 48 and be transferred to the turbine 50, where it will be expanded to generate electrical power via the generator 52. The spent working fluid is then transferred out of the turbine 50 utilizing the turbine outlet conduit 22, and the cycle will repeat itself.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A high efficiency OTEC system, comprising:
   a fluid transfer assembly for cooling and condensing a working fluid, wherein said fluid transfer assembly extends to a first depth of an ocean;
   a pump in fluid connection with said fluid transfer assembly for pressurizing said working fluid;
   a first heater in fluid connection with said pump for vaporizing said working fluid;
   a second heater positioned between said pump and said first heater, said second heater being comprised of an air/fluid heat exchanger;
   a fan adapted to blow warm air across said second heater;
   a collection receptacle positioned underneath said second heater to collect condensed moisture from said warm air for generating potable water;
   a turbine in fluid connection with said first heater for expanding said working fluid; and
   a generator connected to said turbine for generating electrical power.

2. The high efficiency OTEC system of claim 1, wherein said first depth is at least 930 meters below a surface of said ocean.

3. The high efficiency OTEC system of claim 1, wherein said fluid transfer assembly is comprised of at least one condenser conduit.

4. The high efficiency OTEC system of claim 3, wherein said fluid transfer assembly is further comprised of a return conduit.

5. The high efficiency OTEC system of claim 4, wherein said return conduit is surrounded by insulation.

6. The high efficiency OTEC system of claim 5, wherein said fluid transfer assembly is further comprised of at least one spoke extending outwardly from said return conduit, wherein each of said at least one condenser conduit is positioned at an outer end of said at least one spoke.

7. The high efficiency OTEC system of claim 1, wherein said working fluid is comprised of ammonia.

8. The high efficiency OTEC system of claim 1, further comprising a cold fluid reservoir positioned at a lower end of said fluid transfer assembly.

9. The high efficiency OTEC system of claim 1, further comprising a third heater positioned between said first heater and said turbine.

10. A high efficiency OTEC system, comprising:
    a fluid transfer assembly for cooling and condensing a working fluid, wherein said fluid transfer assembly extends to a first depth of an ocean;
    a pump in fluid connection with said fluid transfer assembly for pressurizing said working fluid;
    a second heater in fluid connection with said pump for heating said working fluid, said second heater being comprised of an air/fluid heat exchanger;
    a fan adapted to blow warm air across said second heater;
    a collection receptacle positioned underneath said second heater to collect condensed moisture from said warm air for generating potable water;
    a potable water conduit fluidly connected between said collection receptacle and a potable water storage vessel;
    a first heater in fluid connection with said second heater for further heating of said working fluid;
    a third heater in fluid connection with said second heater for further heating of said working fluid;
    a turbine in fluid connection with said third heater for expanding said working fluid; and
    a generator connected to said turbine for generating electrical power.

11. The high efficiency OTEC system of claim 10, wherein said first depth is at least 930 meters below a surface of said ocean.

12. The high efficiency OTEC system of claim 10, wherein said fluid transfer assembly is comprised of at least one condenser conduit.

13. The high efficiency OTEC system of claim 12, wherein said fluid transfer assembly is further comprised of a return conduit.

14. The high efficiency OTEC system of claim 13, wherein said return conduit is surrounded by insulation.

15. The high efficiency OTEC system of claim 14, wherein said fluid transfer assembly is further comprised of at least one spoke extending outwardly from said return conduit, wherein each of said at least one condenser conduit is positioned at an outer end of said at least one spoke.

16. The high efficiency OTEC system of claim 10, wherein said working fluid is comprised of ammonia.

17. The high efficiency OTEC system of claim 10, further comprising a cold fluid reservoir positioned at a lower end of said fluid transfer assembly.

18. A high efficiency OTEC system, comprising:
    a fluid transfer assembly for cooling and condensing a working fluid, wherein said working fluid is comprised of ammonia, wherein said fluid transfer assembly extends to a first depth of an ocean, wherein said first depth is at least 930 meters below a surface of said ocean;
    wherein said fluid transfer assembly is comprised of at least one condenser conduit, wherein said fluid transfer assembly is further comprised of a return conduit, wherein said fluid transfer assembly is further comprised of a plurality of spokes extending outwardly from said return conduit, wherein each of said plurality of condenser conduits is positioned at an outer end of each of said plurality of spokes;
    a cold fluid reservoir positioned at a lower end of said fluid transfer assembly;
    a pump in fluid connection with said fluid transfer assembly for pressurizing said working fluid, wherein said pump is positioned above a surface of said ocean;
    a second heater in fluid connection with said pump for heating said working fluid, said second heater being comprised of an air/fluid heat exchanger;
    a fan adapted to blow warm air across said second heater;
    a collection receptacle positioned underneath said second heater to collect condensed moisture from said warm air for generating potable water;
    a potable water conduit fluidly connected between said collection receptacle and a potable water storage vessel;
    a first heater in fluid connection with said second heater for further heating of said working fluid;
    a third heater in fluid connection with said second heater for further heating of said working fluid, wherein said third heater is comprised of a solar heater;
    a turbine in fluid connection with said third heater for expanding said working fluid; and
    a generator connected to said turbine for generating electrical power.

* * * * *